US009562695B2

United States Patent
Yingst et al.

(10) Patent No.: US 9,562,695 B2
(45) Date of Patent: Feb. 7, 2017

(54) MOISTURE MANAGEMENT DEVICES AND SYSTEMS FOR OVENS

(71) Applicant: Turbochef Technologies, Inc., Carrollton, TX (US)

(72) Inventors: Thomas E. Yingst, Carrollton, TX (US); Carl Jay Dougherty, Plano, TX (US)

(73) Assignee: Turbochef Technologies, Inc., Carrollton, TX (US)

( * ) Notice: Subject to any disclaimer, the term of this patent is extended or adjusted under 35 U.S.C. 154(b) by 526 days.

(21) Appl. No.: 13/803,540

(22) Filed: Mar. 14, 2013

(65) Prior Publication Data

US 2014/0261373 A1 Sep. 18, 2014

(51) Int. Cl.
*F24C 15/32* (2006.01)
*A21B 3/04* (2006.01)
*A47J 36/38* (2006.01)

(52) U.S. Cl.
CPC .............. *F24C 15/327* (2013.01); *A21B 3/04* (2013.01); *A47J 36/38* (2013.01)

(58) Field of Classification Search
CPC .......... F24C 15/327; F24C 15/20; A21B 3/04; A47J 36/38
See application file for complete search history.

(56) References Cited

U.S. PATENT DOCUMENTS

| 2,888,871 | A | * | 6/1959 | Fischer | ................... F24C 15/20 |
| | | | | | 126/21 A |
| 5,434,390 | A | | 7/1995 | McKee et al. | |
| 5,886,326 | A | | 3/1999 | Tang | |
| 2006/0260476 | A1 | * | 11/2006 | Helm | ............................... 99/476 |
| 2009/0200295 | A1 | | 8/2009 | Beausse et al. | |
| 2011/0072983 | A1 | * | 3/2011 | Helm | ............................... 99/473 |

\* cited by examiner

*Primary Examiner* — Alfred Basichas
(74) *Attorney, Agent, or Firm* — Kilpatrick Townsend & Stockton LLP; Dean W. Russell; Kristin M. Crall

(57) ABSTRACT

Embodiments of the present invention generally provide devices and systems for re-routing escaping steam and grease from an oven interior to a separate compartment of the oven where the live steam and grease can be condensed and safely disposed.

12 Claims, 6 Drawing Sheets

MOISTURE MANAGEMENT DEVICES AND SYSTEMS FOR OVENS

FIELD OF THE INVENTION

Embodiments of the present invention relate generally to devices and systems for re-routing escaping steam and grease from an oven interior to a separate compartment located externally from the oven where the live steam and grease can be condensed and safely disposed.

BACKGROUND

Convection microwave ovens often create steam during the cooking process. Depending upon the food products being cooked, the steam may also be laden with grease, which can create a mess if the oven is not cleaned properly on a regular basis. Some ovens provide a vent that vents the steam directly to the outside atmosphere at the back of the oven. However, the steam can condense on the back (or side) of the oven, and if the steam is laden with grease, once the water evaporates, there remains a grease film that is unsanitary and unsightly. This film may also form on surfaces outside the oven. Accordingly, new systems are need in order to manage and re-route escaping grease-laden steam from convection microwave ovens, or other ovens that may experience similar problems.

U.S. Pat. No. 5,434,390 describes a filter box that is provided within the oven. In use, the air stream containing the debris passes from the cooking chamber into a filter duct, which causes the airborne grease to liquefy and condense thereon; the filter duct may be removed from the oven for cleaning. The filter box of this patent, however, is designed to be housed within the actual oven body. The new moisture management system described herein can work in addition to this filter duct, adding extra grease laden removal and accumulation properties.

U.S. Pat. No. 5,886,326 describes a microwave waste incinerator, which draws vapor through a pipe by a vacuum blower and uses a two-way valve that directs vapor from the cooking chamber to a cooler, where the vapor is condensed and drained into a storage tank. After the condensates are drained, they are moved to an incineration phase.

U.S. Publication No. 2009/0200295 describes a microwave oven with a drain orifice, which allows discharge of steam condensates, fat, and water. The discharge orifice is positioned on the oven floor and is protected by a protective grid or strainer, which is placed against a surface of the oven floor at the periphery of the discharge orifice.

BRIEF SUMMARY

Embodiments of the invention described herein thus provide devices and systems for re-routing escaping steam and grease from an oven interior to a separate capture compartment where the live steam and grease can be condensed and safely disposed.

DETAILED DESCRIPTION

Embodiments of the present invention provide improved devices and systems for delivering better moisture management for ovens. Instead of allowing the oven to disperse steam into the atmosphere outside the oven, the present invention captures the steam, which is likely grease and fat laden, and delivers it to a separate capture compartment. This allows the device to re-route escaping steam and grease from the oven interior to the separate and discrete capture compartment, where the live steam and grease can be condensed and safely disposed.

Figure 1:
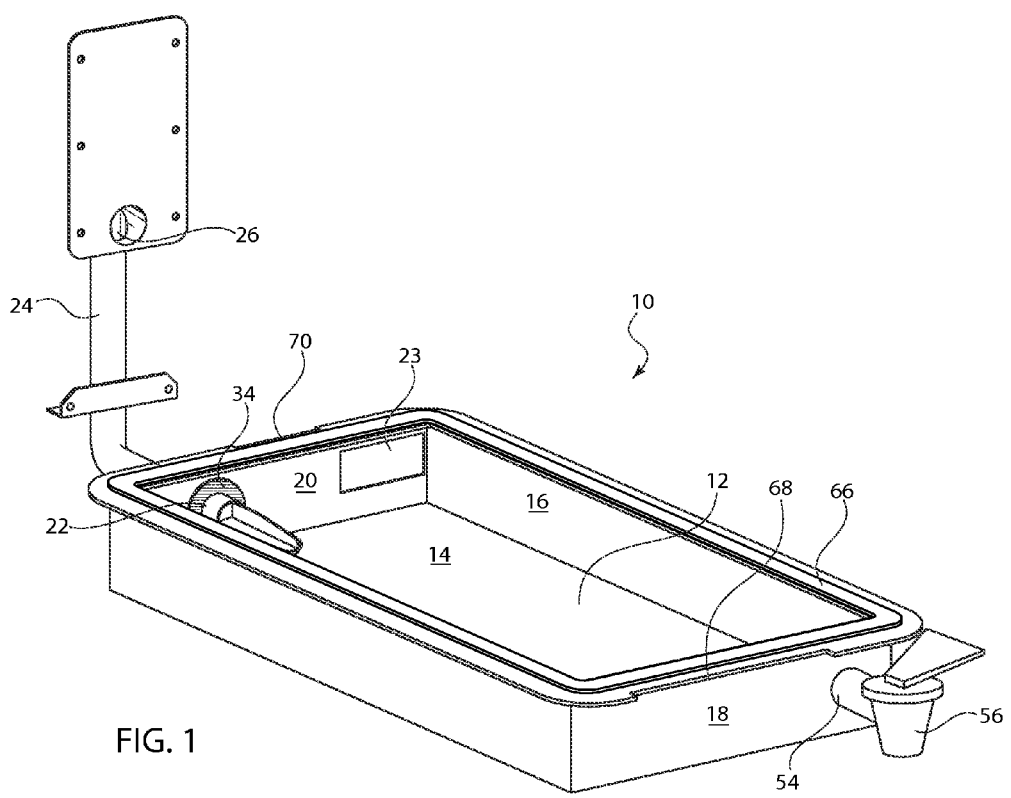
FIG. 1 shows a side perspective view of portions of the steam re-routing device according to one embodiment of the invention.

As shown in FIG. 1, the device 10 includes a capture compartment pan 12 that has a base 14, side walls 16, a front wall 18, and a back wall 20. The back wall 20 has an opening 22 which is designed to cooperate with, connect with, or otherwise receive a ducting member 24. An additional opening 23 in the back wall 20 may be provided in order to provide pressure relief and act as a vent. This additional opening 23 may be louvered or perforated.

Figure 2:
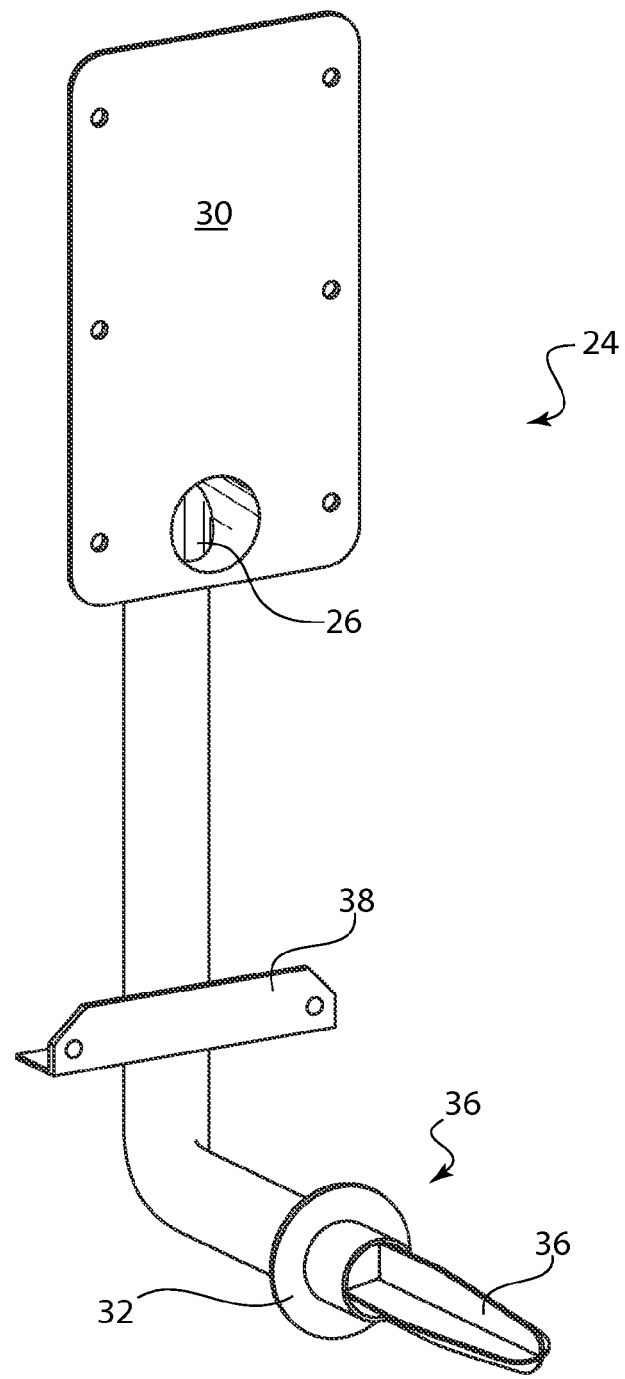
FIG. 2 shows a side perspective view of a ducting member according to one embodiment of the invention.

An exemplary ducting member 24 is shown in FIG. 2. Ducting member 24 is shown as a generally tubular member, which provides a path for re-routing steam from an oven interior to the compartment 12. The ducting member 24 acts as an exhaust tube that re-routes the escaping steam (which is often grease laden steam) to the capture compartment 12 that is positioned either below or on the side of the oven. The ducting transfers the live steam (and grease) to the compartment 12, where it can be condensed and captured.

Ducting member 24 has an oven connecting end 26 and a compartment connecting area 28, which terminates at end 36. The oven connecting end 26 may have an optional mounting plate portion 30, which helps secure and maintain the ducting member 24 in place relative to the oven. The compartment connecting end 36 of the ducting member 24 has a compartment abut 32, which functions to position the end 36 with respect to the compartment 12 and to also prevent any outflow of steam. (As shown in FIG. 1, an optional o-ring seal 34 may also be provided which helps secure the end 36 in place and prevent outflow of steam.) The very tip of the compartment connecting end 36 may have divided portions 36 and serves as a lead-in point for ease of engagement of the manifold to the pan. Providing a point or a simulated cone helps ease penetration of the end 36 into the base and serves as a connecting aid. The ducting member 24 may also have one or more additional securing mechanisms 38 associated therewith.

Figure 3:
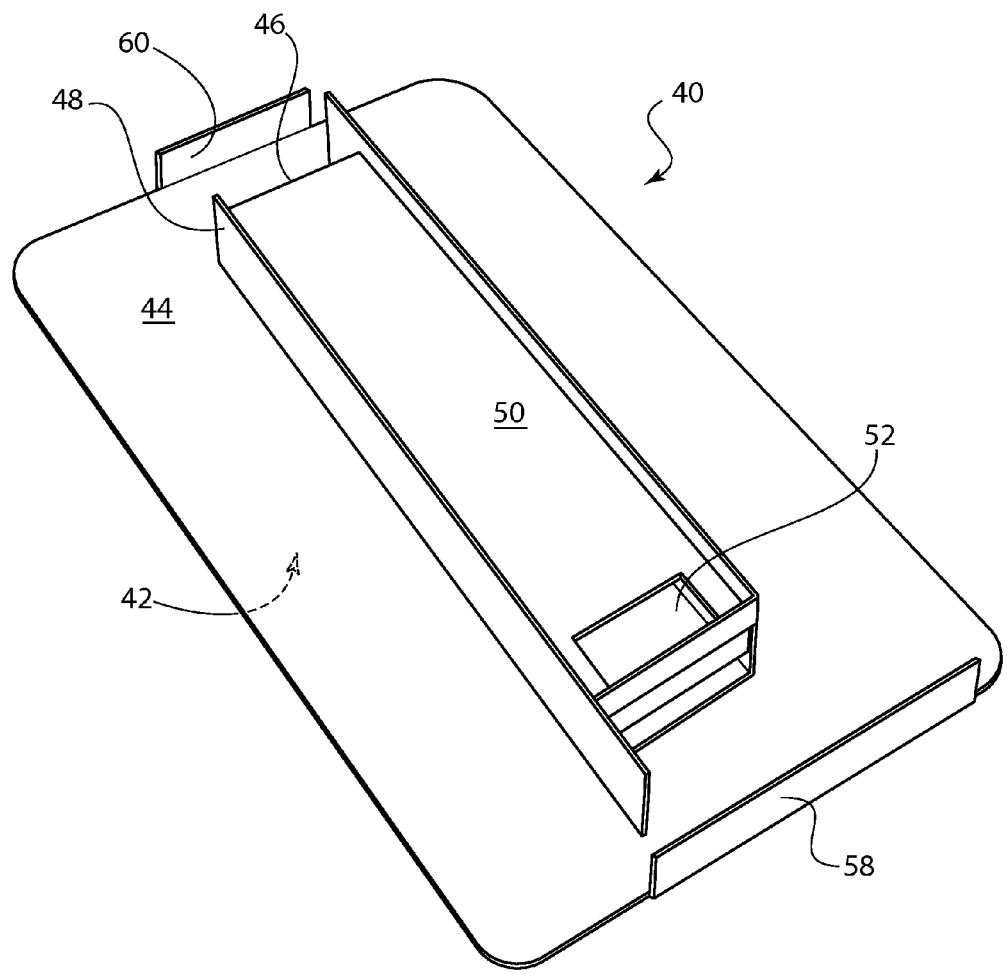
FIG. 3 shows a side perspective view of the underneath surface of a cover lid according to one embodiment of the invention.
Figure 4:
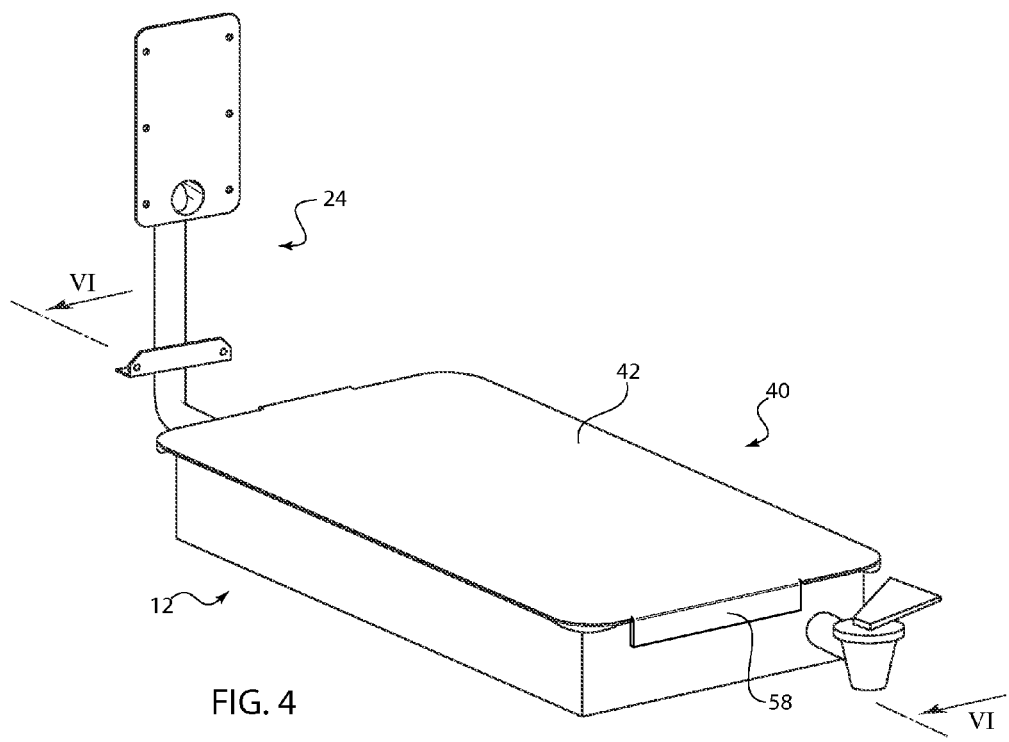
FIG. 4 shows a side perspective view of an assembled device.

The compartment 12 also cooperates with a cover lid 40. One example of an embodiment of a cover lid 40 is shown in FIG. 3. The cover lid 40 has an upper surface 42 and an underneath surface 44. (FIG. 3 shows a more detailed view of the underneath surface 44, and FIG. 4 shows an example of upper surface 42 of lid 40, as it is positioned on the capture compartment 12.) Referring to FIG. 3, the cover lid 40 is shown having a front flange 58 and a back flange 60, which are used to secure the lid in place over the compartment 12. The front flange 58 from the lid may sit in a notch or slot 68 that may be cut or formed in the front wall 18 of pan, as shown in FIG. 1. The back flange 60 may sit in a notch or slot 70 that may be cut or formed in the back wall 20. The flanges 58, 60 are shown as being different sizes, which assists with alignment and also helps mistake-proof the assembly, as the flanges are sized to fit into the correspondingly-sized notch. This is an optional feature, and it should be understood that the lid may fit against the pan without flanges, or the flanges may be similarly-sized, and may be sized differently than as shown. FIG. 4 shows an example of the assembled device 10, including the capture compartment 12, ducting member 24, and cover lid 40. The cover lid has an upper surface 42 on which the oven with steam to be re-routed may rest or otherwise be positioned.

Figure 5A:
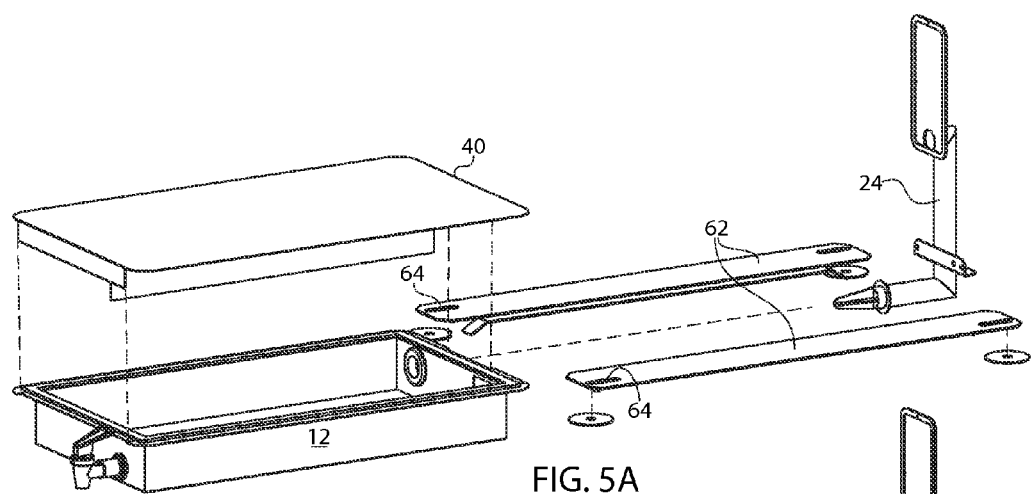
FIG. 5a shows an exploded view of a steam re-routing device.
Figure 5B:
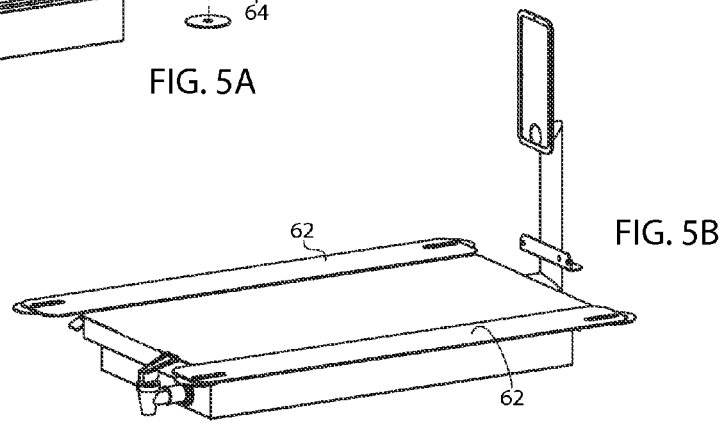
FIG. 5b shows the steam re-routing device of FIG. 5a in an assembled configuration.

In an alternate embodiment, there may be rails provided with offsets that are attached to the oven underside (or to the top of the cover lid) in which the assembled device can slide into position, while the steam routing device 24 engages with the base. One example of this embodiment is illustrated in FIGS. 5a and 5b, which show exploded and assembled views of one embodiment of a moisture management pan. FIG. 5a shows optional mounting bracket rails 62 which may be positioned alongside the cover lid 40 and function to guide the pan into place on the oven and secure it thereto. The rails 62 may each have one or more oven securing features 64, which allow the oven to be mounted to the rails 62, and consequently, to the steam re-routing device 10. The compartment 12 may also have an optional gasket 66, which assists in providing a seal between the lid and pan. Alternatively, the device may be positioned alongside the oven, and if space is a primary consideration, it is possible to provide a longer ducting such that the device 10 may be located remotely from the oven.

As shown in FIG. 3, the underneath surface 44 of the cover lid 40 has one or more channels 46 positioned thereon. The channels 46 may be formed from individual baffles 48 that are welded to the underneath surface, the channels may be formed integrally with the lid 40 via extrusion, or they may be formed from any other appropriate method. As shown in FIG. 3, one channel 46 may be formed as a box-shaped portion 50 with an opening 52. The baffle(s) ensures that the exhaust is forced into the lower ⅓ of the tray to improve the condensing of the exhaust (steam) with the water located in the tray.

Figure 6:
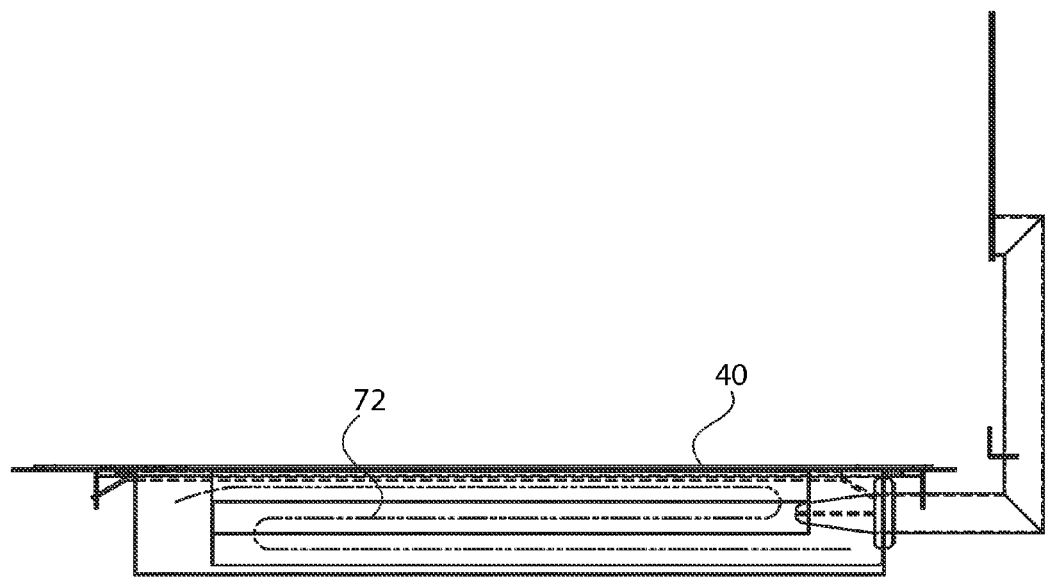
FIG. 6 shows a cross-sectional view of a cover lid baffle.

FIG. 6 shows a cross-sectional view of one potential baffle configuration. The lid cover 40 is shown having a baffle air path 72. In this embodiment, the baffles 48 for an inner labyrinth for the steam to travel. This can be beneficial to manage the steam path and to allow it reduce its temperature and condense, as desired.

Figure 7:
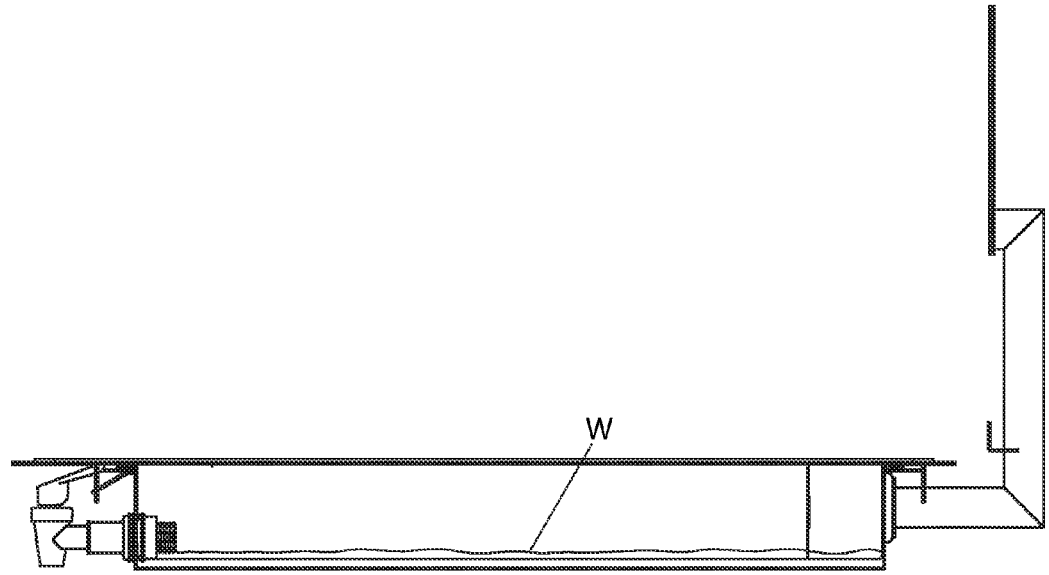
FIG. 7 shows a side perspective view of the steam re-routing device suggested water level.

In use, grease laden steam from the oven is directed away from the oven and to the compartment 12 via ducting member 24. Channels 46/baffles 48 on the lid 40 help to direct/channel the steam and improve contact of the steam with condensing water, if provided. The base 14 of the compartment 12 provides a surface onto which steam may condense. To enhance performance, a small volume of water (e.g., from about ¼" to about ⅜" deep) should optimally be left in the bottom of the compartment 12 to provide a surface on which the live steam may condense and to provide a seal between the baffle and pan bottom. As example of this is illustrates in FIG. 7, which shows a low layer of water W in the pan. The water level for this seal is automatically set by the height of the drain port 54 and drain valve 56. The theory is that live steam has a temperature of 212° F., and the water in the compartment has a lower temperature. Hotter material will always migrate toward cooler material, so the moisture will accumulate in the compartment base for easy removal.

The front wall 18 of the compartment may be provided with a drainage port 54, into which a drain valve 56 may be positioned. The drain is positioned so that even when fully drained, the appropriate amount of water remains in the pan for proper operation. The drain valve 56 may be an automatic or a manual drain valve, and it assists with the removal of the water that has condensed from the steam. This is an optional feature, as the user may simply wish to remove and clean the compartment. Even if a drain valve 56 is provided, the user may still wish to periodically clean the compartment. This can be done by disconnecting the compartment from the ducting 24 and removing the compartment for cleaning.

In an alternative embodiment (not shown), the compartment 12 may be provided with a drawer feature, which allows only the drawer to be removed for cleaning, without having to disconnect the entire compartment 12 from the ducting 24 and thus, the oven.

Changes and modifications, additions and deletions may be made to the structures and methods recited above and shown in the drawings without departing from the scope or spirit of the invention and the following claims.

What is claimed is:

1. A device for re-routing steam from a cooking chamber of an oven, comprising:
   a. a capture compartment positioned externally to the cooking chamber;
   b. a ducting member to provide a connection between the cooking chamber of the oven and the capture compartment; and
   c. a cover lid for the capture compartment, the cover lid comprising an underneath surface with a series of vertically stacked channels forming an air path configured to channel incoming steam.

2. The device of claim 1, wherein the capture compartment is positioned below the oven.

3. The device of claim 1, wherein the capture compartment is positioned to the side of the oven.

4. The device of claim 1, further comprising mounting rails for positioning the device appropriately with respect to the oven.

5. The device of claim 1, wherein the channels configured to channel steam comprise a box-shaped configuration with an opening that allows steam exiting the channels to be directed toward a lower portion of the capture compartment.

6. The device of claim 5, wherein the channels comprise a labyrinth in which steam may travel.

7. The device of claim 5, wherein the one or more channels are formed from baffles welded to the cover lid.

8. The device of claim 1, wherein the capture compartment further comprises a drain valve.

9. The device of claim 1, further comprising an o-ring at a junction between the ducting member and the capture compartment.

10. The device of claim 1, further comprising a securing mechanism that secures the ducting member to the oven.

11. The device of claim 1, further comprising a gasket configured to maintain a seal between the capture compartment and the cover lid.

12. The device of claim 1, wherein the cover lid comprises a front flange and a back flange configured to cooperate with corresponding notches on the capture compartment.

\* \* \* \* \*